United States Patent [19]

Crothers

[11] 4,349,574
[45] Sep. 14, 1982

[54] METHOD AND APPARATUS TO MAKE COOKIES

[75] Inventor: William G. Crothers, Princeton, N.J.

[73] Assignee: Deer Park Baking Co., Hammonton, N.J.

[21] Appl. No.: 305,918

[22] Filed: Sep. 28, 1981

[51] Int. Cl.³ .............................................. A21D 6/00
[52] U.S. Cl. .................................... 426/496; 99/353; 425/237; 425/362; 425/363; 426/512
[58] Field of Search .................. 426/496, 512; 99/353; 198/606, 607; 425/237, 362, 363

[56] References Cited

U.S. PATENT DOCUMENTS

| | | | |
|---|---|---|---|
| 1,724,827 | 8/1929 | Costello | 425/362 |
| 1,971,087 | 8/1934 | Werner | 425/362 |
| 2,167,388 | 7/1939 | Kremmling | 425/362 |
| 2,212,743 | 8/1940 | Kremmling | 198/607 |
| 3,318,264 | 5/1967 | Weidenmiller | 425/362 |
| 4,075,359 | 2/1978 | Thulin | 426/512 |
| 4,229,487 | 10/1980 | Crothers | 426/496 |

Primary Examiner—Robert L. Lindsay, Jr.
Attorney, Agent, or Firm—Stephen E. Feldman; Marvin Feldman; Jules L. Chaboty

[57] ABSTRACT

An apparatus to make cookies which consists of a drum shaped device for shaping the cookies. The drum shaped device termed a die roll receives dough from a feed roll which in turn removes dough from a feed hopper. The die roll then deposits the shaped dough on the surface of a transfer conveyor at a first location. The transfer conveyor moves the dough bits to a second location adjacent to an oven conveyor. As the dough bits leave the transfer conveyor at the second location they are made to topple onto their side when they are received by the oven conveyor. While they lay on their side the formerly flat base becomes slightly rounded. After they are baked in the oven all the baked surfaces are now rounded.

17 Claims, 5 Drawing Figures

METHOD AND APPARATUS TO MAKE COOKIES

FIELD OF THE INVENTION

This invention relates generally to making cookies. Specifically this invention relates to an apparatus and method for making cookies.

BACKGROUND OF THE INVENTION

While the invention is subject to a wide range of applications, it is especially suited to use in an apparatus to make improved cookies and will be particularly described in that connection.

In the past, a number of machines have been used to form cookies in a desired shape by the use of a rotary die drum. The shaped cookies are then transferred to a conveyor belt which then carries the cookies into the oven for baking. Generally, the cookies have substantial flat surfaces which stick together when the cookies are panned in order to coat them with chocolate, for instance.

For example, my U.S. Pat. No. 4,229,487 is directed to a method and apparatus to make cookies. The product made with the aforedescribed apparatus results in small conically shaped cookies with a minimum of flat surfaces. When these cookies are coated with chocolate in a panning process the bases of these conically shaped cookies stick together.

U.S. Pat. No. 859,999 to Werner describes a machine for making flat cookies such as animal crackers. These animal crackers present a major problem if it is necessary to coat the cracker with chocolate or the like. The extensive flat surfaces will cause a major sticking problem which will interfere with production of the product.

U.S. Pat. No. 1,755,963 to Male also results in the production of a dough product having extensive flat surfaces. These flat surfaces will again present a major problem when coating the baked product with chocolate.

U.S. Pat. No. 1,964,969 to Werner shows a machine for making a round flat surfaced cookie which is not suited to panning in order to coat the cookie with chocolate or the like.

Finally, the U.S. Pat. No. 3,318,264 to Weidenmiller shows an apparatus for producing circular flat faced cookies which present the same problem to being coated with chocolate as the aforedescribed patents.

Accordingly, it is an object of the present invention to provide for an apparatus to shape and bake cookie dough resulting in a cookie having all surfaces rounded;

It is a further object of the present invention to bake a cookie which can be panned for coating with chocolate without two or more cookies sticking together.

SUMMARY OF THE INVENTION

Accordingly there has been provided an apparatus to make improved cookies comprising a die roll having cavities for shaping the dough. A feed hopper is disposed above and to the side for feeding dough to the die roll. The shaped dough bits are deposited onto a transfer conveyor nearby the roll for additional movement. The transfer conveyor moves the dough bits from a first location near the die roll to a second location. The dough bits are moved from the transfer conveyor to an oven conveyor at the second location. In the transfer from the transfer conveyor to the oven conveyor the dough bit is made to fall on its side. The shaped dough enters the oven on its side and is baked on its side.

For a better understanding of the present invention, together with other and further objects thereof, reference is had to the following description taken in connection with the accompanying drawings while its scope will be pointed out in the appended claims.

DESCRIPTION OF THE PREFERRED EMBODIMENT

Figure 1:
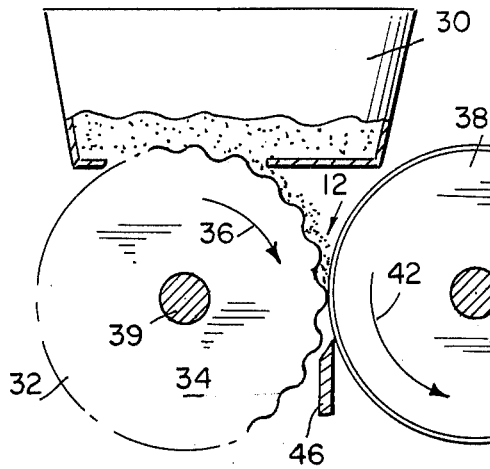
FIG. 1 is a side view of a cookie machine in accordance with the present invention.

An apparatus for making improved cookies consists of a dough transfer device 12 for filling the cavities of die roll 38 so as to form dough bits of configuration 14. The die roll 38 deposits the formed dough 14 onto transfer surface 48 of transfer conveyor 18. Transfer conveyor 18 moves the formed dough 14 from first location 50 to a second location 52 where the formed dough bits 14 are transferred to an oven conveyor 22. In the transfer to the oven conveyor 22 the formed dough 14 is dropped on its side to form dough bit 15. The dough bit 15 is baked to result in a cookie without flat surfaces.

Referring to FIG. 1, an apparatus to make improved cookies 10 comprises a dough transfer device 12 which forces dough into the cavities of a die roll 38 to form cookies of the desired configuration. The term cookie refers to the dough after it has been baked, for the purposes of this disclosure the term used will be dough bits or shaped dough for the unbaked dough.

The apparatus to make improved cookies 10 consists of a hopper 30 which contains the mass of dough to be shaped into cookies. The dough transfer device 12 is comprised of a feed roll 32 which is cylindrical in shape and has a corrugated metal 34 mounted on its periphery. The feedroll 32 is located below the hopper 30 and picks up dough from hopper 30 which sticks to the corrugated metal 34 and the dough is carried in the direction shown by an arrow 36.

Figure 1A:
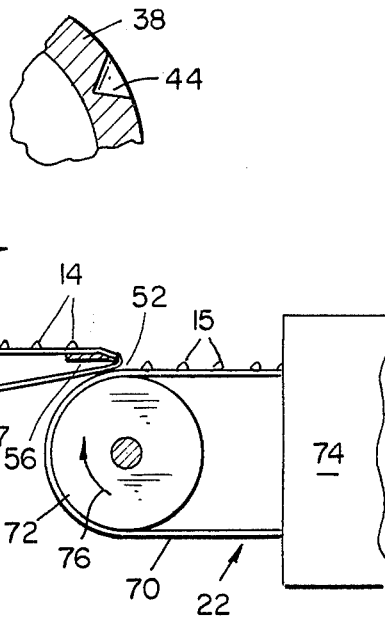
FIG. 1A is an enlarged crossection of the die roll surface.

The outside diameter of feed roll 32 makes contact with die roll 38. The outside surface of die roll 38 is provided with a plurality of inverted cone shaped cavities 44, best seen in the enlarged cross section shown in FIG. 1A. Feed roll 32 is mounted on a second shaft 39 so that feed roll 32 moves in the direction of arrow 36 and die roll 38 moves in the direction of an arrow 42. There is a positive drive connection between feed roll 32 and die roll 38 so that they move together when powered by drive means not shown. The excess dough which does not fill the cavities 44 is removed from the surface of die roll 30 by a doctor blade 46.

Die roll 38 is generally made of highly polished metal so that dough forced into cavities 44 by feed roll 32 can be latter extracted. It is preferable, in the present invention, to coat the interior of cavities 44 with teflon to prevent the dough from sticking within the cavities. The teflon has a lower co-efficient of friction than the highly polished surface and is required in the present design because of the large amount of dough which contacts the walls of the cavities.

A transfer conveyor 18 which includes an endless conveyor belt 47 which is in contact with die roll 38 at a first location 50. Conveyor belt 47 has a transfer surface 48 which is herein considered a portion of the endless conveyor belt 47. Further, transfer surface 48 extends between first location 50 where a dough bit 14 is received on the transfer surface 48 to second location 52 where dough bit 14 is removed from the transfer surface 48.

The support for endless conveyor belt 47 consists of a rotating drum 54 at the first location 50 and a nose bar 56 at the second location 52. The drum 54 may be made of a resilient material, such as rubber, so that a continual pressure will be exerted by drum 54 against conveyor belt 47 and against die roll 38. Conveyor belt 47 is preferably canvas and it is pressed into contact with die roll 38 by drum 54 in order to assure die roll 38 driving conveyor belt 47.

Figure 2:
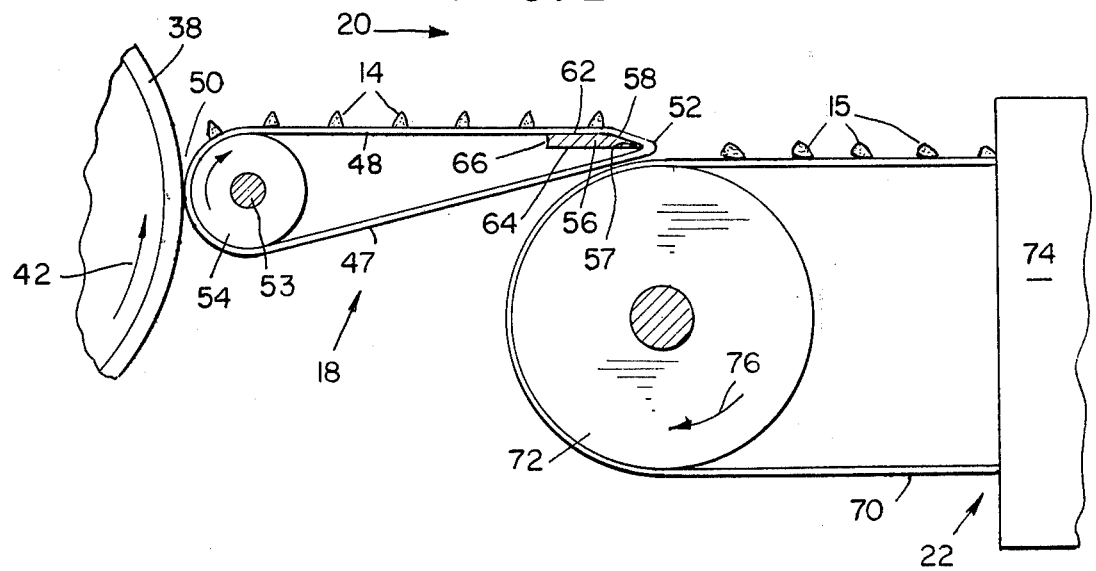
FIG. 2 is an enlarged view of the dough bit transfer process at the second location.

Nose bar 56 is seen in FIG. 1 and is better seen and described in FIG. 2. Nose bar 56 is here seen to have a knife like edge 57 formed by a first surface 58 and a second surface 64 contacting each other. Conveyor 47 is wrapped around knife like edge 57 and makes sliding contact with nose bar 56. The nose bar further consists of a flat surface 62 parallel to second surface 64 and an end surface 66 at right angles to the second surface 64. The nose bar 56 is fixed to the body of the machine 10 and is not movable except for occasional operating adjustments. The transfer surface 48 as it moves over surface 62 of nose bar 56 is horizontal and substantially tangent to the horizontal portion of an oven conveyor belt 70.

Oven conveyor belt 70 is part of an oven conveyor 22 and is supported on a second rotating drum 72. Conveyor belt 70 is preferably steel and is supported by another rotating drum not shown. Since conveyor belt 70 enters oven 74 and is subject to the oven temperatures it is made of steel or some similar temperature resistant material. Oven conveyor belt 70 moves in the direction shown by an arrow 76 and is caused to move by a motor means, not shown, coupled to second rotating drum 72.

An important aspect of the present invention is the relationship between the transfer conveyor 18 and the oven conveyor 22. FIG. 2 shows that as dough bits 14 reach second location 52 the dough bit 14 sticks to the transfer surface 48 and rides toward the knife like edge 57. As dough bit 14 reaches the edge of knife like edge 57 it topples off of transfer surface 48 and falls onto oven conveyor belt 70. At second location 52 the knife like edge 57 is held above the conveyor belt 70 about 1½ to 2 base diameter of dough bit 14. Since the base diameter of cookie 14 is approximately ⅜ of an inch, the height of knife like edge 57 is approximately 9/16 of an inch to ¾ of an inch. Within this range of spacing the dough bit 14 will fall on its side and become an improved dough bit 15 resting on oven conveyor belt 70.

While the present embodiment shows the nose bar 56 which has inclined surface 58 it is contemplated that the present invention will be operable if the nose bar 56 comprised a flat plate parallel to the transfer surface 48 or a rod about which transfer conveyor 47 can bear against. Further, while the transfer point at second location 52 is shown directly over the center of second rotating drum 72 it may vary from this position by an angle of 30° and the invention is still operable.

Figure 3A:
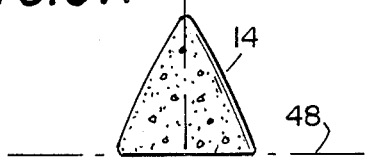
FIG. 3A is a side view of the dough bit on the transfer belt.

FIG. 3A shows a dough bit 14 on transfer surface 48 after it leaves die roll 38. The flat base of dough bit 14 is shown resting on transfer surface 48. The dot and dash line denotes the axis of symmetry for dough bit 14.

Figure 3B:
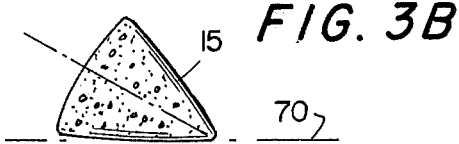
FIG. 3B is a side view of the improved dough bit on the oven conveyor belt.

FIG. 3B shows improved dough bit 15 which is dough bit 14 on its side and resting on oven conveyor belt 70. The dot and dash line shows the axis of symmetry with respect to the oven conveyor belt 70. In addition, it will be seen that what was a flat base in the dough bit 14 is now a rounded base in the improved dough bit 15. The rounding of the base of dough bit 15 is due to the plastic dough moving toward conveyor belt 70 because of the weight of the dough and surface tension of the dough.

In general, dough bit 14 comprises a cone-shape with a flat base sitting on transfer surface 48. The height of the cone-shaped dough bit is approximately equal to the diameter of the base and is approximately ⅜ inch. The improved dough bit 15 shows dough bit 14 on its side showing the now rounded base which is perpendicular to the axis of symmetry. The improved dough bit 15 is now baked so that the final cookie has a rounded base.

The applicant has found that when the cone-shaped cookie bit 14 was panned, that the cookies 14 tended to stick together at their bases. The process of panning involves the tumbling of cookie bits in a barrel when it is desired to coat the surface of the cookie with a substance such as chocolate or a wax to shine the already coated cookie bit. The applicant has also found that by baking the cookie bit 14 on its side, such as cookie 15, the flatness of the base is destroyed and therefore, cookie bit 15 is generally much better suited for use in the panning process.

Broadly speaking, the composition of the present invention for forming the cookie bit comprises flour, sugar and shortening. It has been found that a desirable sugar-shortening ratio is in the range of 1.5:1 to 2.5:1 and preferably about 2.0:1.

It is also understood that the term "shortening" as used hereinbefore and hereinafter throughout the specifications and claims includes all fats and oils present in the dough composition.

The dough is mixed and baked under conventional processing operations and conditions as is well known in the art.

In the prior art the "count per pound" of cookies varied from about 35 (heavy sandwich creme) up to about 200 (small shortbread or wafer). The cookie bits of the present invention, however, have a count per pound of about 1000 to 1500, and generally about 1200 per pound. The size-weight volume relationship of the present cookie bits permits a broad range of packaging. It is also noted that the rounded conical bit achieves the desired handling characteristics of a spherical particle without presenting the difficulties inherent in making spherical cake or cookie products. In addition to its use in ice cream, the improved cookie bits can be used as a present topping or additive; cereal or additive to cereal; health food; confection (coated or uncoated); cheese snack or peanut butter snack.

Although the cookie has been described with a conical configuration, it is within the scope of the present invention to use cookie bits of other shapes, such as, for example, cylinders or frustroconical configurations.

In order to more fully understand the present invention, a description of its operation follows. The improved apparatus to make cookies 10 operates by feed roll 32 receiving dough from the feed hopper 30 in the corrugated metal 34. The feed roll 32 moves in a clockwise direction and the dough caught in the corrugated metal 34 is pressed into the cavities 44 found in the surface of die roll 38 at the point of contact. As the cavities 44 move away from the point of contact the doctor blade 46 removes excess dough from the surface of die roll 38 feed roll 32 and drum device 38 are mechanically connected so as rotate in unison.

When the die roll 38 passes into contact with endless conveyor belt 47 the rotating drum 54 presses the belt 47 into cavities 44 and into contact with the base of the dough in cavities 44. As die roll 38 rotates it causes endless conveyor belt 47 to move in the direction of an arrow 20. When belt 47 contacts the base of the dough in cavities 44 the base adheres to the conveyor belt 47 and the dough is withdrawn from cavities 44 as the belt 47 separates from the die roll 38, the point of transfer is designated first location 50. Dough bits 14 are then conveyored along the transfer surface 48 to second location 52 where the formed dough is removed from the transfer surface 48.

Removal of dough bit 14 requires that the bottom of nose bar 56 be separated from the second rotating drum 72 by 1½ to 2 dough bit base diameters. Under the foregoing conditions dough bit 14 will drop off of transfer conveyor 18 onto oven conveyor 22 and rest on its side as dough bit 15. As dough bit 15 it enters the oven 74 for baking on its side to form improved cookie 15.

It is an important aspect of the present invention to coat or enrobe the cookie bits prior to panning, and that in the process of the present invention the formed cookie bit 15 is better suited for such panning than in the prior art. As aforesaid, coating or enrobing may be done with chocolate, and then further coated with a wax.

The aforedescribed improved apparatus to make cookies accurately produces cookies of a desired configuration and is relatively uncomplicated and therefore, inexpensive to manufacture and operate.

While there has been described what is at present considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A machine to make improved cookies, comprising:
   (a) dough shaping means for forming dough into individual dough bits, each of said bits comprising a conical shape having a flat base;
   (b) transfer conveyor means being dipsosed adjacent to said dough shaping means and having a transfer surface extending between a first location and a second location, said dough bits being removed from said shaping means at said first location by said transfer conveyor means with said base of said conical shape on said transfer surface, and said dough bits being transferred to said second location where said transfer conveyor means further comprises means to orient said dough bits so that each of said dough bits lies on the side of the conical shape; and
   (c) oven conveyor means adjacent to said transfer surface for receiving said shaped dough on its side for baking thereof whereby said dough bits are baked to make cookies having a rounded base.

2. The machine as defined in claim 1 further characterized in that said transfer surface is tangent to said oven conveyor means at said second location which is directly above the center of a second rotating drum.

3. The machine as defined in claim 2 further characterized in that said transfer surface is approximately 1½ to 2 dough bit base diameters above said oven conveyor means.

4. The machine as defined in claim 3 further characterized in that said transfer surface is tangent to said oven conveyor means within approximately ±30° of a point directly above the center of said second rotating drum.

5. The machine as defined in claim 4 further characterized in that said transfer conveyor means includes a first rotating drum at said first location and a nose bar at said second location.

6. The machine as defined in claim 5 further characterized in that said first rotating drum is made of resilient material.

7. The machine as defined in claim 6 further characterized in that said transfer conveyor means provides said transfer surface between said first location and second location.

8. The machine as defined in claim 7 further characterized in that said transfer conveyor means is pressed into contact with said dough shaping means by said first rotating drum.

9. The machine as defined in claim 8 further characterized by said dough shaping means including a die roll having a plurality of cavities for forming said dough into dough bits of a desired configuration.

10. The machine as defined in claim 9 further characterized by said cavities each being of conical configuration.

11. The machine as defined in claim 10 further characterized in that said each cavity is teflon coated.

12. The machine as defined in claim 11 further characterized in that said transfer conveyor belt is canvas.

13. The machine as defined in claim 12 further characterized in that said dough shaping means further includes a feed roll adjacent said die roll for pressing said dough into said cavities and a doctor blade adjacent said die roll for stripping excess dough from said die roll.

14. A method for making an improved cookie, comprising:
   (a) forming dough by dough shaping means into individual dough bits, each dough bit comprising a conical shape having a flat base;
   (b) transferring said bits by transfer conveyor means from a first location to a second location, said bits being removed from said dough shaping means with said base on said transfer conveyor means at said first location; and
   (c) transferring said bits from said transfer conveyor means at said second location to an oven conveyor means;
   (d) orienting said dough bit being transferred from said transfer conveyor means to said oven conveyor means, so that it lies on said conical shape when received by said oven conveyor means whereby said dough bit is baked on said conical shape to make a cookie having a rounded base.

15. The method of claim 14, wherein said orienting of said dough bit comprises separating said transfer conveyor means at said second location from said oven conveyor means by a distance of 1½ to 2 dough bit base diameters.

16. The method of claim 14, fiber comprising;
   (a) baking said dough bit to form the rounded base cookie bit; and
   (b) panning said cookie bits so as to coat said cookie bit.

17. The method of claim 16, said coating being at least one selected from chocolate and wax.

* * * * *